Sept. 19, 1939.　　　E. E. BURKHART　　　2,173,751
CORN SLICER
Filed Jan. 6, 1938
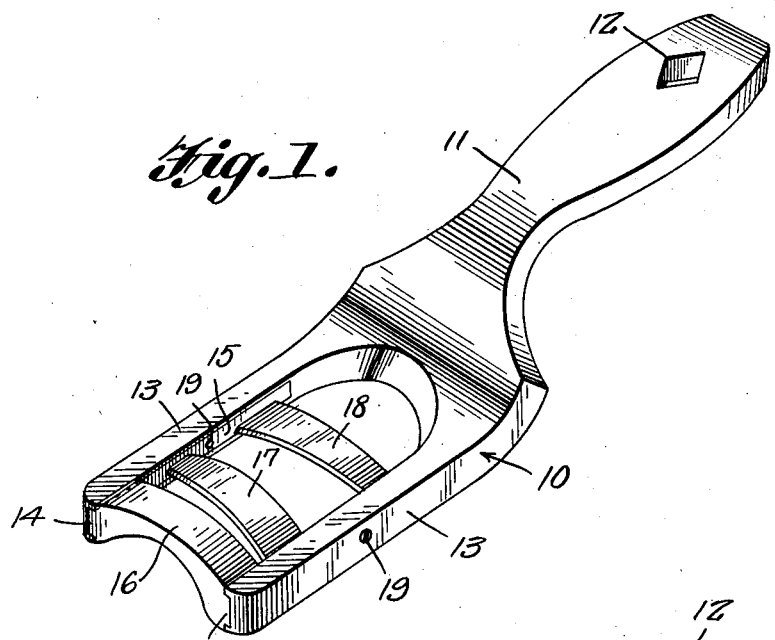
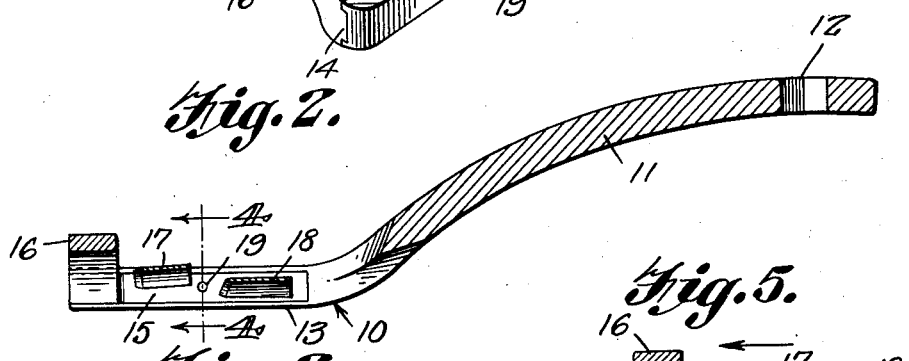
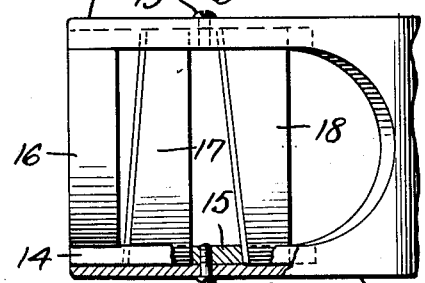
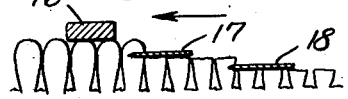
Ernest E. Burkhart,
INVENTOR
BY Victor J. Evans & Co.
ATTORNEYS Patented Sept. 19, 1939

2,173,751

UNITED STATES PATENT OFFICE 2,173,751

CORN SLICER

Ernest E. Burkhart, Hot Springs, Ark.

Application January 6, 1938, Serial No. 183,706

1 Claim. (Cl. 146—4)

The object of the invention is to provide an implement for the removal of corn from the cob, so that the operation may be readily done by hand and the grain cut up into small particles of substantially uniform size; to provide an implement of the kind indicated in which the cutting elements are removable, so that they may be easily detached for sharpening or replacement; and generally to provide a corn slicer which is of simple form and susceptible of cheap manufacture.

With this object in view, the invention consists in a construction and combination of parts of which a preferred embodiment is illustrated in the accompanying drawing but to which the invention is not to be restricted. Practical application may dictate certain changes or alterations and the right is claimed to make any which fall within the spirit of the invention.

In the drawing:

Figure 1 is a perspective view of the invention.

Figure 2 is a central longitudinal sectional view.

Figure 3 is a plan view, partly in section, of the cutting head.

Figure 4 is a sectional view on the plane indicated by the line 4—4 of Figure 2.

Figure 5 is a diagrammatic view showing the blades arranged at different heights with respect to the head to provide for one cutting at a lower level than that which precedes it.

Figure 6 is a view similar to Figure 5 but shows the cutting blades at the same level.

The head portion 10 of the implement which may be made of any suitable material has formed integrally therewith a handle portion 11 which is off-set from the plane of the head, so that when the latter is in contact with an ear of corn, the handle will be spaced from the latter to provide finger room for the hand of the user. In the handle is formed an opening 12 which is angular in shape, so that it may be used either as a means for supporting the device on a hook or nail, or as a wrench for use where the latter may be necessary.

The head 10 is of U-shape, the legs 13 being grooved on their inner faces to provide guide grooves for the ribs 14 formed on the legs 15 of the knife frame, these legs being connected only at one end by a yoke member 16 arched, as indicated, transversely of the head.

The blades 17 and 18 are carried by the knife frame and are of tapering form, as shown. They span the legs of the knife frame and are supported in the latter by entering slots formed in the legs of the knife frame but are so arranged in the latter that their rear edges are at right angles to the longitudinal axis of the head which disposes their cutting edges at angles to said longitudinal axis. But the blades are disposed in the knife frame with the smaller end of one at the opposite side of the frame than the smaller end of the other, so that the angles of the cutting edges of the two blades are relatively reversed. The arrangement of the cutting edges at angles to the axis provides for a shearing cut in the operation of the device in removing corn from the cob.

The blades are arched transversely of the head and when the knife frame is removed from the latter may be mounted in the frame by slipping the smaller ends through the larger slots in the legs of the frame and sliding the blades along until the smaller ends enter the smaller slots. When the frame is thereafter inserted in the body, the legs of the latter will retain the blades in position and the frame is secured in the head by means of screws 19 which pass through body holes in the legs 13 of the head and enter threaded holes in the legs 15 of the knife frame.

In the operation of the invention, the yoke member 16 acts as a guide in the slicing operation, as indicated in Figures 5 and 6, the arched portion resting on top of the grains of corn when the cutting edges of the blades will be below the top edges, so that the corn is cut off in small particles as the implement is advanced by the hand of the user. If the blades are arranged at different levels, as indicated in Figure 5, the leading blade 17 will cut a certain distance below the level of the yoke and the blade 18 the same distance below the level of the blade 17. Or the blades may be arranged at the same level, as indicated in Figure 6, when the blade 18 will function in effect as a finishing blade to cut off any projecting portions left by the blade 17.

The invention having been described, what is claimed as new and useful is:

An implement of the kind indicated comprising a U-shaped head having a handle and spaced legs of which the latter are provided with guide grooves on their inner faces, a knife frame embodying legs and a connecting yoke united with the legs at one end of each, the legs on the knife frame being provided with ribs slidably engaging the guide grooves in the legs of the head, fastening means mounted in the legs of the head and engaging the legs of the knife frame and spaced from each other and from the yoke, the yoke and the blades being arched and the former having its undersurface at a higher level than the undersurfaces of the latter, the blades being of tapering width and relatively reversely disposed and extending through slots in the legs of the knife frame with their ends abutting the legs of the head.

ERNEST E. BURKHART.